United States Patent
Carpenter et al.

(10) Patent No.: US 9,930,058 B2
(45) Date of Patent: Mar. 27, 2018

(54) ANALYZING CYBER-SECURITY RISKS IN AN INDUSTRIAL CONTROL ENVIRONMENT

(71) Applicant: HONEYWELL INTERNATIONAL INC., Morristown, NJ (US)

(72) Inventors: Seth G. Carpenter, Phoenix, AZ (US); Eric T. Boice, Peoria, AZ (US); Andrew Kowalczyk, Phoenix, AZ (US); Ken Dietrich, Glendale, AZ (US); Ganesh P. Gadhe, Maharashtra (IN); Eric D. Knapp, Milton, NH (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 14/669,980

(22) Filed: Mar. 26, 2015

(65) Prior Publication Data
US 2016/0050225 A1  Feb. 18, 2016

Related U.S. Application Data

(60) Provisional application No. 62/036,920, filed on Aug. 13, 2014.

(51) Int. Cl.
*H04L 29/06* (2006.01)
*H04L 12/26* (2006.01)

(52) U.S. Cl.
CPC .......... *H04L 63/1433* (2013.01); *H04L 43/04* (2013.01); *H04L 63/1416* (2013.01)

(58) Field of Classification Search
CPC .. H04L 63/1433; H04L 43/04; H04L 63/1416
See application file for complete search history.

(56) References Cited

U.S. PATENT DOCUMENTS

| | | | |
|---|---|---|---|
| 6,259,679 B1* | 7/2001 | Henderson | H04J 3/0688 370/254 |
| 8,219,214 B1* | 7/2012 | Mimlitz | G05B 15/02 340/3.1 |
| 8,726,393 B2 | 5/2014 | Macy et al. | |
| 8,776,168 B1 | 7/2014 | Gibson et al. | |
| 9,800,604 B2* | 10/2017 | Knapp | H04L 63/1433 |
| 2007/0016955 A1* | 1/2007 | Goldberg | G06Q 40/08 726/25 |
| 2007/0050777 A1* | 3/2007 | Hutchinson | G06F 11/0709 718/104 |

(Continued)

FOREIGN PATENT DOCUMENTS

| KR | 2008112284 A | 5/2008 |
|---|---|---|
| KR | 20100002592 A | 1/2010 |
| KR | 101060277 B1 | 8/2011 |

*Primary Examiner* — Mohammad A Siddiqi
(74) *Attorney, Agent, or Firm* — Jetter & Associates, P.A.

(57) ABSTRACT

A method of analyzing cyber-security risks in an industrial control system (ICS) including a plurality of networked devices includes providing a processor and a memory storing a cyber-security algorithm. The processor runs the cyber-security algorithm and implements data collecting to compile security data including at least vulnerability data including cyber-risks (risks) regarding the plurality of networked devices by scanning the plurality of devices, processing the security data using a rules engine which associates a numerical score to each of the risks, aggregating data including ranking the risks across the plurality of networked devices and arranging the risks into at least one logical grouping, and displaying the logical grouping(s) on a user station.

18 Claims, 9 Drawing Sheets

(56) References Cited

U.S. PATENT DOCUMENTS

| | | | |
|---|---|---|---|
| 2010/0017746 A1* | 1/2010 | Husoy | G06F 9/4443 |
| | | | 715/781 |
| 2010/0125911 A1 | 5/2010 | Bhaskaran | |
| 2011/0288692 A1* | 11/2011 | Scott | G06F 21/55 |
| | | | 700/297 |
| 2013/0104236 A1* | 4/2013 | Ray | H04L 63/1408 |
| | | | 726/25 |
| 2013/0174256 A1* | 7/2013 | Powers | H04L 63/1416 |
| | | | 726/23 |
| 2013/0227697 A1* | 8/2013 | Zandani | H04L 63/1433 |
| | | | 726/25 |
| 2014/0337086 A1* | 11/2014 | Asenjo | G06Q 10/0635 |
| | | | 705/7.28 |
| 2015/0082399 A1* | 3/2015 | Wu | G06F 21/6209 |
| | | | 726/6 |
| 2015/0281287 A1* | 10/2015 | Gill | G06F 21/55 |
| | | | 726/1 |
| 2015/0301515 A1* | 10/2015 | Houmb | G06F 21/552 |
| | | | 700/108 |
| 2015/0350914 A1* | 12/2015 | Baxley | H04W 12/08 |
| | | | 726/11 |
| 2015/0373038 A1* | 12/2015 | Blackwell | G06F 21/554 |
| | | | 726/23 |
| 2016/0070915 A1* | 3/2016 | Knapp | G06F 21/577 |
| | | | 726/25 |
| 2016/0182486 A1* | 6/2016 | Wu | G06F 21/6209 |
| | | | 726/28 |
| 2016/0234239 A1* | 8/2016 | Knapp | H04L 63/1433 |
| 2016/0330228 A1* | 11/2016 | Knapp | H04L 63/1433 |

* cited by examiner

| DASHBOARD | ANALYSIS | | ☰ HONEYWELL \| CYBERSECURITY RISK ADVISOR | | | | ≡ ⋮⋮ ⋮ NET SITE RISK |
|---|---|---|---|---|---|---|---|
| 🔍 | | | HOME ZONE 5 EST-104 | | | | |
| NAVIGATE BY: | | | | | | | |
| SITE ▸ | | | ● EST-104 | | | | |
| | | | RISK ITEM: MALWARE | | | | |
| ▸ ZONE 1 | | | EVENT TYPE ⇅ | GAUGE ⇅ | SOURCE ⇅ | DATE / TIME ⇅ | SEVERITY ⇅ |
| ▸ ZONE 2 | | | ▸ AUTHENTICATION FAILURE | MALWARE | WINDOWS SECURITY | 02/01/2014 2:00 PM | ERROR |
| ▸ ZONE 3 | | | ▸ VIRUS DETECTION | MALWARE | ANTIVIRUS | 01/31/2014 2:00 AM | CRITICAL |
| ▸ ZONE 4 | | | ▸ AUTHENTICATION FAILURE | MALWARE | WINDOWS SECURITY | 01/30/2014 12:30 AM | ERROR |
| ▾ ZONE 5 | | | ▸ QUARANTINED FILE | MALWARE | ANTIVIRUS | 01/30/2014 1:00 AM | CRITICAL |
| ● ESVT-01A | | | ▸ AUTHENTICATION FAILURE | MALWARE | WINDOWS SECURITY | 01/29/2014 1:30 PM | ERROR |
| ● ESVT-01B | | | ▸ VIRUS DETECTION | MALWARE | ANTIVIRUS | 01/29/2014 12:00 PM | CRITICAL |
| ● EST-101 | | | ▸ VIRUS DETECTION | MALWARE | ANTIVIRUS | 01/28/2014 10:00 PM | CRITICAL |
| EST-102 | | | ▸ QUARANTINED FILE | MALWARE | ANTIVIRUS | 01/28/2014 8:00 AM | CRITICAL |
| EST-103 | | | ▸ ACCOUNT LOCKED OUT | MALWARE | WINDOWS SECURITY | 01/28/2014 7:00 PM | CRITICAL |
| ● EST-104 | | | | | | | |
| EST-105 | | | | | | | |
| EST-106 | | | | | | | |
| EST-107 | | | | | | | |
| EST-108 | | | | | | | |
| EST-201 | | | | | | | |
| EST-202 | | | | | | | |
| EST-203 | | | | | | | |
| EST-204 | | | | | | | |
| ● L3 SWITCH G | | | | | | | |
| ● L3 SWITCH Y | | | | | | | |
| ▸ ZONE 6 | | | | | | | |

ANALYZING CYBER-SECURITY RISKS IN AN INDUSTRIAL CONTROL ENVIRONMENT

CROSS REFERENCE TO RELATED APPLICATIONS

This application claims the benefit of Provisional Application Ser. No. 62/036,920 entitled "ANALYZING CYBER-SECURITY RISKS IN AN INDUSTRIAL CONTROL ENVIRONMENT", filed Aug. 13, 2014, which is herein incorporated by reference in its entirety.

FIELD

Disclosed embodiments relate to cyber-security for networks associated with industrial control systems.

BACKGROUND

Computer systems are used in performing a variety of different tasks. For example, an industrial network of computer systems and equipment are used in controlling and/or monitoring industrial systems termed industrial control systems (ICS). Such ICS can be used in connection with manufacturing, power generation, energy distribution, waste handling, transportation, telecommunications, oil refining, and water treatment. The ICS may be connected and accessible via other networks, both directly and indirectly, including a corporate network and the Internet.

The industrial network may thus be susceptible to both internal and external cyber-attacks. As a preventive measure from external cyber-attacks, firewalls or other security measures may be taken to separate the industrial network from other networks.

In an ICS, cyber-security is of increasing concern, and it is generally difficult to quickly determine the potential sources of cyber-risk to the whole system. Modern ICS generally contain a mix of equipment including WINDOWS servers and workstations, switches, routers, firewalls, safety systems, proprietary real-time controllers and field devices. Often this equipment is a mixture of equipment from different vendors.

Moreover, ICS operators may not have a complete understanding or inventory of all the devices/equipment running in the ICS. Unaddressed security vulnerabilities in any of this equipment can disrupt production or cause unsafe conditions in the ICS. Such system failures may be the result of a malicious attack, a disgruntled employee, a virus, or just the result of a mistake coupled with a lack of cyber-security measures. Even stand-alone equipment can be vulnerable, as viruses can be introduced directly via Universal Serial Bus (USB) memory "sticks".

SUMMARY

This Summary is provided to present a summary to briefly indicate the nature and substance of this Disclosure. It is submitted with the understanding that it will not be used to interpret or limit the scope or meaning of the claims.

Disclosed embodiments recognize there is no centralized interface in an industrial control system (ICS) that aggregates cyber-security state and cyber-risk into a single point of focus, to enable providing situational awareness, decision support, prioritization, and an assessment to a user to enable pre-emptive security enhancing action(s) to be taken. Accordingly, there is a recognized need for a cyber-security risk analysis system and algorithm that compiles potential cyber-security vulnerabilities in ICS (e.g., plant) network environments, prioritizes the security vulnerabilities based on the risk to the ICS to guide the user(s) to take action(s) which mitigate the vulnerabilities. Disclosed cyber-security risk analysis system aggregate categories of security state and cyber-risk for devices in the ICS into a single point of focus supply that can be displayed on a user interface or "dashboard".

There are several significant aspects provided by disclosed cyber-security algorithms and methods. One is the near-real-time continuous nature of the risk assessment rendered, and another is the application of domain specific knowledge (i.e., understanding of ICS systems) to the calculation of cyber security-risk.

It is noted it would not be impossible for a single individual to keep up with the sheer volume of events and parameters measured that are utilized by disclosed cyber-security algorithms for analyzing and calculating cyber-security risks. Even with a team of individuals it would not be possible. Moreover, some of the networked devices monitored are capable of generating thousands of events every second, so that it would not be possible to provide the essentially real-time monitoring that disclosed cyber-security algorithms and methods provide.

As used herein the term "cyber-security risk" in an ICS network generally refers to any cyber-security control that is deficient, misconfigured, or otherwise vulnerable to a cyber-attack. Security risk includes, but is not limited to, missing patches, out-of-date anti-virus software, excessive security privilege, inappropriate use, and unauthorized changes. As used herein "deficient" is defined as there being either no control in place (missing) or the control that is in place is insufficient for the task, "misconfigured" is defined as appropriate control being in place but is configured in a way or positioned in a place that renders it partially or totally ineffective, and 'vulnerable" is defined as when an appropriate control is in place, but it is out-of-date or unpatched, causing it to be vulnerable/susceptible to cyber-attacks. Besides vulnerability, cyber-security risk can additionally be a function of threat level (i.e., the degree to which vulnerabilities are likely to be exploited), and the consequence (i.e., how severe of an impact would be felt if the networked device being measured for cyber-security risk were successfully exploited).

DETAILED DESCRIPTION

Disclosed embodiments are described with reference to the attached figures, wherein like reference numerals, are used throughout the figures to designate similar or equivalent elements. The figures are not drawn to scale and they are provided merely to illustrate aspects disclosed herein. Several disclosed aspects are described below with reference to example applications for illustration. It should be understood that numerous specific details, relationships, and methods are set forth to provide a full understanding of the embodiments disclosed herein.

One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. Disclosed embodiments are not limited by the illustrated ordering of acts or events, as some acts may occur in different orders and/or concurrently with other acts or events. Furthermore, not all illustrated acts or events are required to implement a methodology in accordance with this Disclosure.

Figure 1:
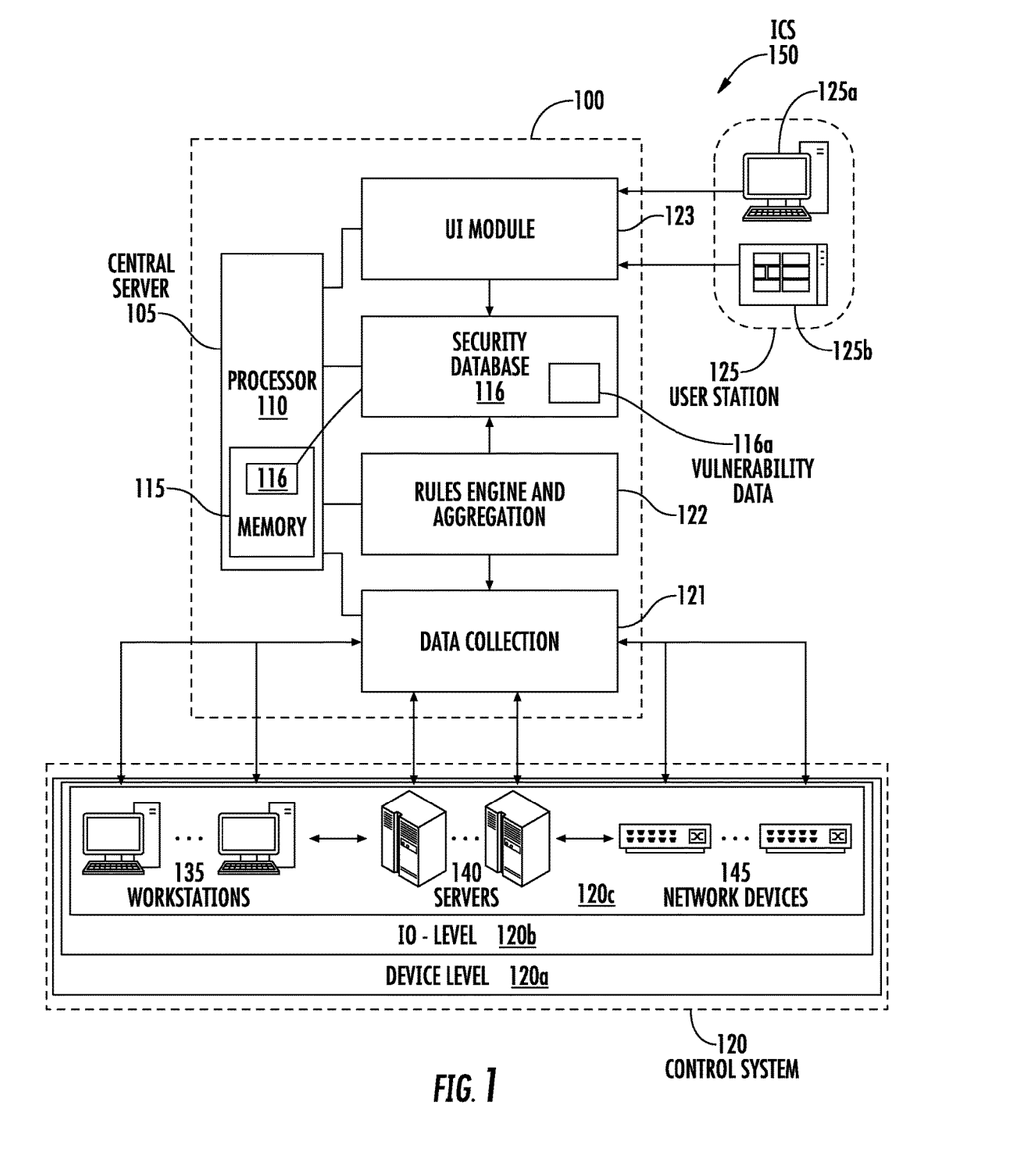
FIG. 1 is an example cyber-security risk analysis system integrated into an ICS, according to an example embodiment.

FIG. 1 is an example cyber-security risk analysis system (risk analysis system) 100 integrated into a network of an ICS 150 including a plurality of networked devices that are monitored, according to an example embodiment. As noted above, ICS 150 can be used in connection with a variety of different control system applications including for example control systems involved in manufacturing, power generation, energy distribution, waste handling, transportation, telecommunications, and water treatment.

Risk analysis system 100 includes a central server 105 shown including a processor 110 (e.g., microcontroller, digital signal processor (DSP) or microcontroller unit (MCU) with an associated memory(ies) 115 upon which disclosed algorithms and database data is stored, including the security database 116 which stores vulnerability data 116a including cyber-risks for the respective devices in the network. As noted above, besides vulnerability, cyber-security risk can be a function of threat level being the degree to which vulnerabilities are likely to be exploited, and the consequence being how severe of an impact would be felt if the networked device being measured for cyber-security risk were successfully exploited. Using disclosed algorithms, processor 110 is shown implementing a data collection module 121, a rules engine and aggregation module 122, and a user interface (UI) module 123. The network implemented by ICS 150 can be a wired (e.g., cable) network, a wireless network, optical network, or any combination of the three (e.g., wired and wireless network).

Figure 2A:
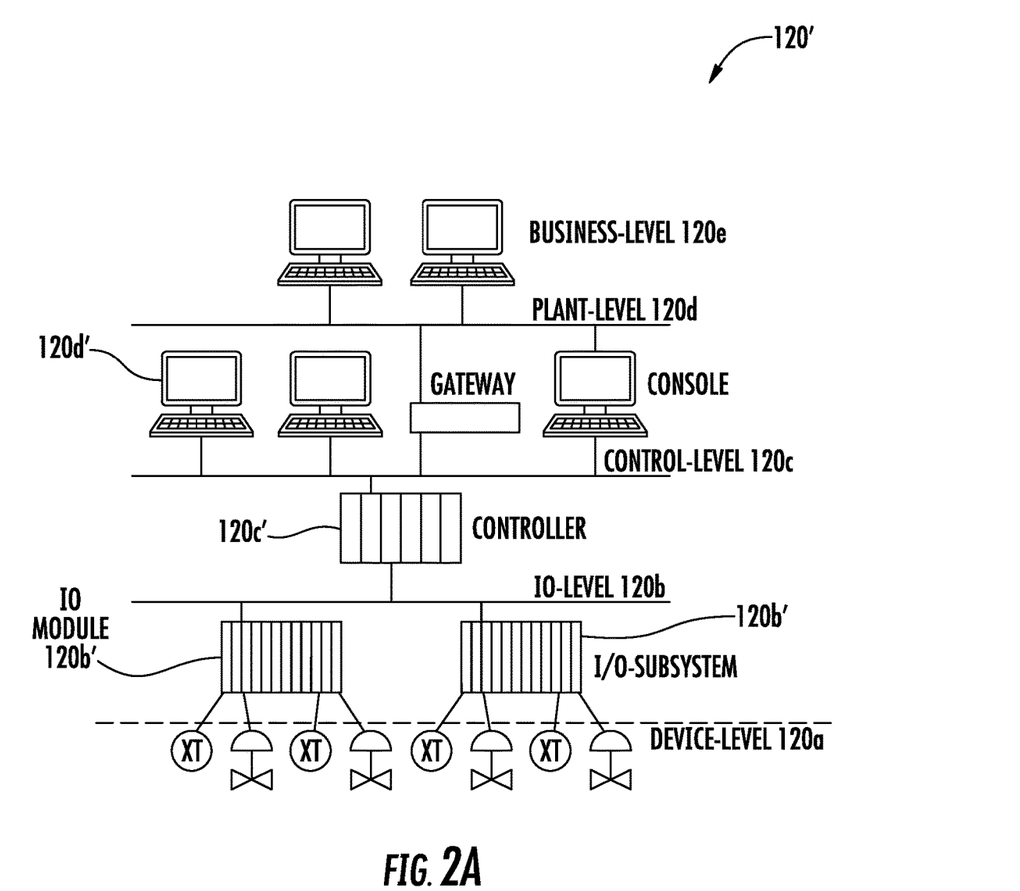
FIG. 2A shows a distributed control system (DCS) having five different tiers of networking with the lower four of those tiers which can benefit from disclosed cyber-security risk analysis systems.

The monitored devices in FIG. 1 are shown as workstations 135, servers 140 and network devices 145 which are part of the control-level 120c of the control system 120, such as a distributed control system (DCS). Control system 120 is also shown including other network levels being a device-level 120a, and an input output (IO)-level 120b. A business-level 120e and plant-level 120d which can comprise other network levels in the control system 120 are not shown in FIG. 1, but are shown and described below in the DCS 120' shown, and described below relative to FIG. 2.

There are three basic approaches to data gathering of vulnerability data and event data (if present) to provide to the data collection module 121 that can be used with disclosed embodiments. The first approach uses a local agent on the monitored device, which is essentially a program that runs locally, collects information of interest relating to vulnerability data and event data (if present) and sends it up to the central device here being the data collection module 121. The second approach is calling remotely into the devices using built-in protocols. WMI and SNMP are examples of these protocols (WMI for WINDOWS PCs, SNMP for network devices). Each time one wants vulnerability data and event data (if present), they request it through the appropriate protocol. The third approach uses features already built into the device or program to subscribe to relevant information. This approach does not require a custom agent needed in the first approach because the capability is already built into the monitored device, nor does it require data requests needed in the second approach. There is the initial subscription to the data (which might happen by configuring the monitored device or through a provided interface), and then all relevant data relating to vulnerability data and event data (if present) is sent automatically to the data collection module 121 when it occurs. SYSLOG is an example of this third approach.

Assuming local agents are present on all devices in the network, the local agent generally collects data and sends the vulnerability data and event data (if present) to data collection module 121, such as using agentless collection protocols on each device (e.g., Windows Management Instrumentation (WMI), Simple Network Management Protocol (SNMP), Syslog), or a combination of these approaches. One particular local agent-based implementation uses Microsoft System Center Operations Manager (SCOM) for data collection. Risk analysis system 100 can thus use a combination of local agents to collect data from workstations 135 (or PCs) and agentless collection to gather data from switches, routers, firewalls and intrusion detection/prevention devices. The raw data can be stored by data collection module 121 in a short-term database (e.g., 7 days of data) and a long term data warehouse (e.g., 12 months of data (or more if configured)). The data can either be collected periodically (polling) the monitored devices or when a change or event on any monitored device in the ICS 150 is detected, such as a firewall or the antivirus software being disabled, or a WINDOWS Security Event.

As noted above, besides local agent-based data collection gathering of vulnerability data and event data (if present) to data collection module 121, such as if a local agent is lacking, the second approach described above comprising calling remotely into the devices using built-in protocols can be used. Alternatively, the third approach described above using features already built into the device or program to subscribe to relevant information can also be used for data collection.

The Rules Engine and Aggregation module 122 can be implemented with a custom developed rules engine which reads data from data collection module 121 embodied as a SCOM database and translates it into normalized data and groupings. Rules Engine and Aggregation module 122 is for receiving asynchronous notifications from SCOM when events occur, and processing them essentially immediately. The Rules Engine and Aggregation module 122 loads the resulting information into the security database 116 in the memory 115.

The security database 116 can be implemented as a MICROSOFT Structured Query Language (SQL) database with a custom schema. Vulnerability data and events are loaded into security database 116 by the Rules Engine and Aggregation module 122 and are consumed by the user station 125, such as through the IU module 123 shown. User station 125 is shown comprising a workstation 125a and a browser 125b that is coupled to one of the endpoints in the Web Application.

The UI module 123 can be implemented as a web application accessed through a browser in the ICS 150. The browser can be located on a personal computer (PC) or other device (e.g., tablet) with permissions to access the UI module 123. UI module 123 can be hosted in MICROSOFT Internet Information Services (IIS) and use SignalR and JSON for real-time notifications of updates to the security database 116 and knockout.js for dynamic webpage functionality. An alternative embodiment of UI module 123 is a standalone application instead of a browser-based application. This application would access the security database 116 directly, without the need for UI module 123 (subject to the security on that database), and use the information to drive the user station 125.

Disclosed methods can include the step of discovering the devices networked in the ICS 150, creating a database of vulnerability and event data for those devices stored in the data collection module 121, and then grouping the devices into security zones for further analysis. For example, FIG. 2B described below shows an example industrial plant 200 divided into a plurality of security zones, where each security zone shown has its own router/firewall 225.

Figure 2B:
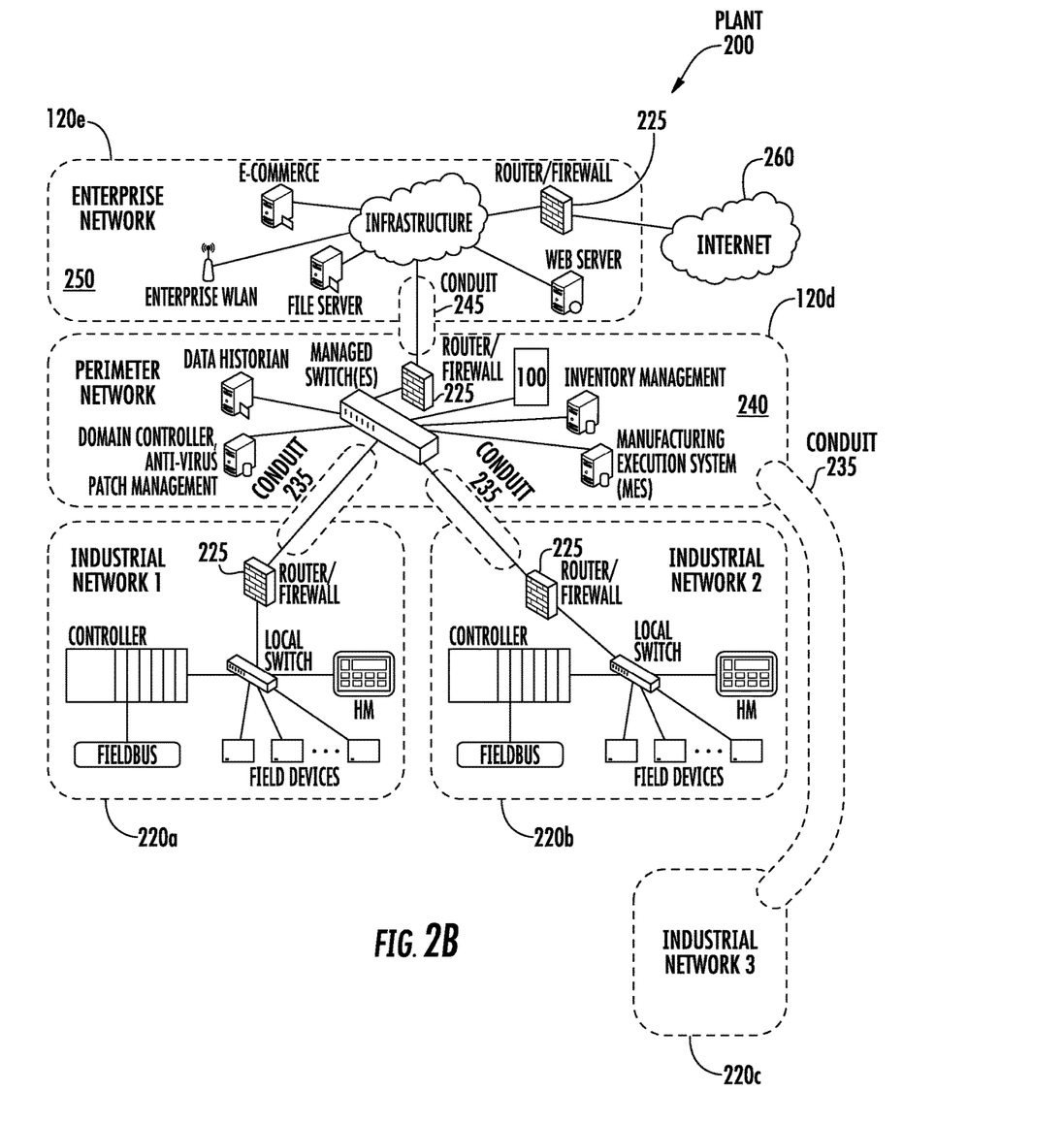
FIG. 2B shows an example industrial plant divided into a plurality of security zones each having their own router or firewall.

For the purposes of this Disclosure, it is generally desired to know what devices in the control network are in the same security zone for disclosed risk calculations. Security zones as used herein can refer to the ANSI/ISA-99 Standards to Improve Control System Security model of zones and conduits, where roughly, devices in a control network that can freely communicate with each other are grouped in the same security zone. Devices that have to go through some conduit (such as a firewall/router 225) are generally grouped into another security zone. If there is a virus or worm detected on one device that can propagate through the network, all devices within the same security zone can be considered to be at risk, because the infected device can contact them directly. The security zones allow determination of which of the devices are connected to the network implemented by the ICS, indicating where a cyber-attack might spread if a particular device in the ICS 150 is compromised.

The data collection module 121 scans these devices for known vulnerabilities (e.g., out-of-date WINDOWS patches) to collect vulnerability (and optional event, threat and consequence) data that is loaded into the security database 116. The data collection module 121 can monitor the devices essentially "continuously" (e.g., every few seconds for events with security implications (e.g., virus detection, WINDOWS authentication failures).

Two different example methods for monitoring devices can be used. The simplest monitoring method is polling, where the value is read at some fixed interval (e.g., once every hour). The other method which can be used when possible is to register with the operating system of the device to be notified any time the value one is interested in changes. This method is generally only possible for certain parameters on certain operating devices (e.g., registry values on WINDOWS machines). When it is not possible to register for notifications for a given parameter, polling is generally used. Areas of monitoring include anti-virus, application whitelisting, WINDOWS security events, network security (including state of switches, routers, firewalls, and intrusion detection/prevention systems), backup status, patching status and asset policies.

After the vulnerability data is collected in the data collection module 121, the vulnerability data is processed by a rules engine and aggregation module 122 having an internal set of rules which first normalizes this data. For example, if some devices use SYMANTEC anti-virus and others MCAFEE anti-virus, the rules engine translates the data collected from each device into a common set of data or analysis. Because of support for a range of application vendors and data sources, it is recognized an effective way to implement disclosed embodiments is generally to normalize the data before performing analysis.

For example, assume support reading anti-virus information from MCAFEE and SYMANTEC anti-virus products. Although the raw data from each of these vendors looks very different, the data from each of these vendors can be modified into some prespecified format so that the analysis does not need to distinguish between these data sources. For instance, suppose MCAFEE anti-virus products stores its virus definition date as MM/DD/YYYY and SYMANTEC anti-virus products stores it as DD-MM-YYYY. One can choose an expected (preferred) format for the data (e.g., YYYY-MM-DD), and then this translation portion of the rules engine and aggregation module 122 can read in these raw strings and convert them to the preferred format. This way the rules themselves will generally never need to alter string or data manipulation themselves, and support can be added for other anti-virus vendors without the need for rule changes.

Using the internal set of scoring rules, a numeric score can be assigned by the rules engine and aggregation module 122 to each risk to quantify the various cyber-risks. A simple example is giving a simple score for each possible cyber-risk to the ICS 150. Assume the cyber-risks are assigned a numeric value from 0 to 100 (e.g., 0 is no risk, 100 is a very high risk). So, if anti-virus is not installed or has been disabled, that can be regarded as a high risk value (e.g., 100). If anti-virus definition files are two weeks out of date, that might be regarded as a low risk (e.g., 25). That risk value can increase as the definition files remain out of date for a longer time.

There can also be more sophisticated scoring rules used by rules engine and aggregation module 122 that take repetition of risks and exposure to connected devices into account. These rules can be modified and fine-tuned by users as needed. The rules engine of the rules engine and aggregation module 122 can then rank the risks across the ICS 150 using the numerical scores arrange them into logical groupings (e.g., security zones, risk sources, risk severity). The rules engine can associate guidance text with each risk to help a user address the risk (e.g., problem description, possible causes, potential impact to the system, recommended actions, see FIG. 4B described below).

The rules engine and aggregation module 122 can also keep historic risk information using the same groupings. This allows users to see the cyber-risk of the ICS 150 over time and find places where cyber-risks occur most frequently. The results from the rules engine and aggregation module 122 processing are placed into a security database 116 that is sent to the user station 125 (or dashboard). Due to the sensitive nature of this security data, access to the security database 116 is generally intended to be limited to only authorized users.

In a WINDOWS domain environment, the web browser at the user station 125 can pass the identity of the current user to the risk analysis system 100. This can be checked against groups in an active directory associated with privileges such as by reading data stored in the risk analysis system 100. The active directory information can be stored in the domain controller which can be part of servers 140. The data a user accesses is generally stored in the security database 116. To clarify, the UI module 123 (or an end user) cannot generally access the security database 116 directly as there is typically an access layer between the UI module 123 and the security database 116 generally being called the Web application programming interface (API) that is a framework for building Hypertext Transfer Protocol (HTTP) services which functions as an access layer. The Web API handles the authentication of a requesting user to see if they have permissions to view the security data, and returns the security data to the user if authorized. If a user requests a page and is a member of a group with permissions, they can be allowed to view the page. If they are not a member of an appropriate group, they can receive an access denied error message.

In the absence of a domain environment, the same function can be performed at the user level. The risk analysis system 100 can be configured with individual users, and the users can be given permissions to reach certain areas of the ICS 150. When accessing the system, the users can be prompted for a username and password. If the login is successful, the risk analysis system 100 can then check that user's privileges to determine if they can access that part of the system.

The workstation 125a can display the vulnerability information in the security database 116 for the user in multiple ways. For relatively inexperienced users, the user station 125 can provide high level indicators of system problems, shown as gauges, numeric representations of risk, and charts of current status and historic views of risk. More experienced users can expand the user station 125 to see more information about the ICS 150 and its cyber-risks. The user can access a system analysis view to see trends and status on individual machines, within zones, and across the ICS 150.

FIG. 2A shows a DCS 120' having five different tiers (levels) of networking that can benefit from disclosed cyber-security risk analysis systems. The network levels include a device-level 120a, IO-level 120b, control-level 120c, plant-level 120d and business level 120e. The device-level 120a includes gauges, valves, transmitters, actuators, sensors and other devices. The IO-level 120b includes IO modules 120b'. The control-level 120c includes at least one controller 120c' which corresponds to the workstations 135, servers 140 and networked devices 145 shown in FIG. 1. It is noted that a controller can be based on a server platform or can be a proprietary platform, so that there can be servers in the DCS 120' that perform the control function which are technically not controllers.

Applied to DCS 120', the risk analysis system 100 can become part of the business-level 120e or the plant-level 120d including consoles 120d' and function by collecting data from levels 120a, 120b, 120c, or 120d (if the risk analysis system 100 is part of the business-level 120e). The vulnerability data collected is then transformed from its raw state (as gathered by data collection module 121) into risk information (done by rules engine and aggregation module 122), and stored in a repository shown as security database 116, and made viewable by end users by UI module 123 to users at workstation 125a of user station 125.

FIG. 2B shows an example industrial plant 200 divided into a plurality of security zones, where each security zone shown has its own router or firewall (router/firewall) 225. Industrial plant 200 is shown including industrial network 1 220a, industrial network 2 220b, industrial network 3 220c, with each having devices corresponding to device level 120a, IO level 120b and control level 120c shown in FIG. 2A. Depending on the plant setup, there may be devices from the plant-level 120d within the individual industrial networks 220a, 220b, and 220c. In the example industrial plant 200 shown in FIG. 2B, the human machine interfaces (HMI) are represented with presented within industrial networks 220a, 220b and 220c. Generally a HMI is performed through an operator console station of some kind, which is part of plant-level 120d in FIG. 2A. Also, although not shown in FIG. 2B, there are generally servers used to provide information for those displays and provide access to controllers.

Industrial network 1 220a, industrial network 2 220b, industrial network 3 220c are each connected by a conduit 235 to the plant-level 120d shown as an industrial perimeter network (perimeter network) 240 which is coupled by another conduit 245 to the business level 120e shown as an enterprise network 250, which is coupled to the Internet 260. The plant-level 120d shown as a perimeter network or demilitarized zone (DMZ) is a physical or logical subnetwork that contains and exposes an organization's external-facing services to a larger and untrusted network. Risk analysis system 100 is shown being part of the plant-level 120d.

Figure 3:
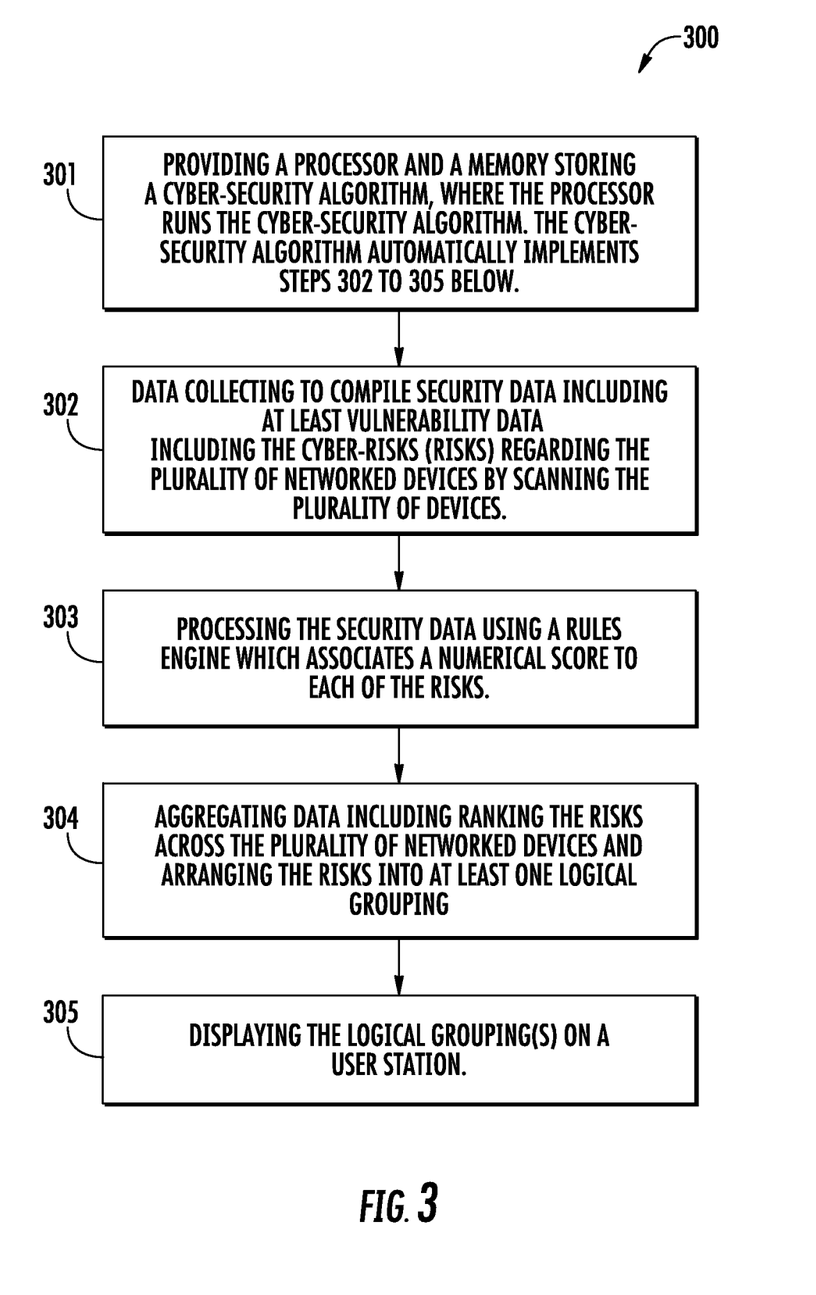
FIG. 3 is a flow chart that shows steps in an example method of analyzing cyber-security risks in an ICS, according to an example embodiment.

FIG. 3 is a flow chart that shows steps in an example method 300 of analyzing cyber-security risks in an ICS, according to an example embodiment. Step 301 comprises providing a processor and a memory storing a disclosed cyber-security algorithm, where the processor runs the cyber-security algorithm. The cyber-security algorithm automatically implements steps 302 to 305, and can implement other steps as well including discovering the plurality of networked devices, and the other optional steps described below.

Step 302 comprises data collecting to compile security data including at least vulnerability data including the cyber-risks (risks) regarding the plurality of networked devices by scanning the plurality of devices. The security data can further comprise threat level data relating to a degree to which vulnerabilities in the vulnerability data are likely to be exploited, and the consequence data relating to a degree of impact felt if the respective networked device were successfully exploited. The data collecting can comprise monitoring the plurality of devices essentially continuously for events with security implications including virus detection, WINDOWS authentication failures, and monitoring include antivirus, application whitelisting, WINDOWS security events, network security including state of switches, routers, firewalls, and intrusion detection/prevention systems, backup status, patching status and asset policies.

Step 303 comprises processing the security data using a rules engine which associates a numerical score to each of the risks. As noted above, vulnerability, threat and consequence data can be combined to calculate a numerical score to respective risks. For example, the combined risk calculation can be based on the ISO/IEC 27005:2011 standard for defining risk. The risk for a given device can be calculated as Risk=Vulnerability*Threat*Consequence, which can be abbreviated as R=V*T*C. The simplest way to perform this calculation is to use values between 0 and 1, which allows direct multiplication without the need to normalize the resulting value of R. These can also be easily represented as percentages. These individual values for V, T and C can be predefined, user selected, or a combination of the two.

Assume one is calculating the risk of a critical device in a system. As this is a critical device, the result if this device were compromised can be very serious, so a value of C=1.0

(or 100%) can be assigned. Assume there are two vulnerabilities on this device, a missing non-security operating patch and no antivirus software installed with vulnerability values of 0.3 (or 30%) and 0.95 (or 95%). Assume there is one active threat detected against the system, a series of repeated access attempts with bad passwords with a threat value of 0.8 (or 80%).

The simplest way to calculate V for this device is to consider the highest threat (0.95). Other algorithms could also be used that might consider the values of all active threats, but a simple calculation is described. The calculation for T is simple as there is a single threat. Using these, it is found R=V*T*C=0.95*0.8*1.0=0.76 (or 76%).

Step 304 comprises aggregating data including ranking the risks across the plurality of networked devices and arranging the risks into at least one logical grouping. For example, users might want to split out risks based on their source. Risks from PCs might go in one group and risks from network devices might go in another. This is useful because often different administrators are responsible for maintaining PCs vs. network devices. Another example would be splitting up the risks based on logic groupings within the site. Control systems are often split into clusters of functionality that correspond to steps in the manufacturing process. Each cluster might be a logical grouping here. The aggregating data can further comprise aggregating categories of a security state of the plurality of networked devices. The at least one logical grouping can includes security zones which allows a determination of which of the plurality of networked devices are connected, indicating where a cyber-attack might spread if one of the plurality of networked devices is compromised, sources of the risks, and severity of the risks.

Step 305 comprises displaying at least the logical grouping on a workstation associated with the user station. The method can further comprising generating guidance text with each of the risks including a problem description, possible causes, potential impact to the ICS and recommended actions, and displaying the guidance text on the user station.

Unique disclosed cyber-security risk analysis system features are believed to include the following:

1. Multi-pass discovery of control system devices: disclosed systems such as risk analysis system 100 can make use of multiple sources for device discovery and combine them to compile a complete picture of the devices in the control system 120 of ICS 150. For example, the data collection module 121 may query a domain controller using a domain controller as part of servers 140 in FIG. 1 to obtain a full list of all the PCs (e.g., workstations 135 shown in FIG. 1 as well as the servers in 140 including the domain controller itself in the ICS 150. The data collection module 121 can then further interrogate those devices to determine their role in the ICS and discover further attached devices that are not part of the domain, such as real-time process controllers. Known solutions in the field can obtain device lists from the domain controller or by interrogating the network, but are not capable of the second pass discovery to find device features such as controller devices in the ICS.

2. Data normalization: disclosed systems are capable of processing and normalizing data for different, individually incompatible systems. Known solutions are usually based on specialized tools that can provide similar information, but only for isolated devices of the ICS, but not for the ICS as a whole.

3. User guidance and ranking of cyber-risks: Disclosed embodiments understand the causes and potential impact of individual cyber-risk items. This allows disclosed algorithms to provide custom guidance to users, allowing them to correct these cyber-risk issues quickly. It can also prioritize security issues based on the potential impact to the system. Known solutions are usually Security Information and Event Management (SIEM) systems that collect large amounts of data across a system, but are unable to provide context for that data or guidance to a user to address security issues. Instead, an expert must analyze and interpret the data by hand and provide their own guidance and recommendations.

EXAMPLES

Disclosed embodiments are further illustrated by the following specific Examples, which should not be construed as limiting the scope or content of this Disclosure in any way.

Regarding cyber-security risk terms, a few examples are provided below. If anti-virus software on a system is being considered, "deficient" can refer to no anti-virus software being installed or the anti-virus software installed is not effective (e.g., a non-security company writes its own anti-virus software), "misconfigured" can refer to anti-virus software being installed, but active protection and periodic scans are disabled, effectively turning off protection for the system, and "vulnerable" referring to anti-virus software is installed and correctly configured, but the definition files have not been updated, rendering it unable to detect new cyber-threats to the system.

Regarding cyber-security risk for a network firewall, deficient can refer to no firewall being installed, misconfigured can refer to a firewall being installed, but it allows all traffic to pass through. Vulnerable can refer to a firewall being is installed with appropriate settings, but it is running a version of firmware with known vulnerabilities which would allow an attack to exploit the system.

A threat example can be the detection of a virus by an anti-virus system, excessive consumption of CPU, memory or network resources (a DOS attack), unauthorized privilege escalations given to existing user accounts, etc. Network threats can be detected intrusions, unexpected consumption of network resources (again, a DOS attack), security alerts or events received from a firewall or other security devices, etc.

A consequence example can be the failure of only one device in a redundant pair (no impact); the loss of sensor fidelity in a non-critical process (minor impact to production or quality); the failure of a key process (major impact to production), and failure of a safety-related system (major impact to HSE).

Figure 4A:
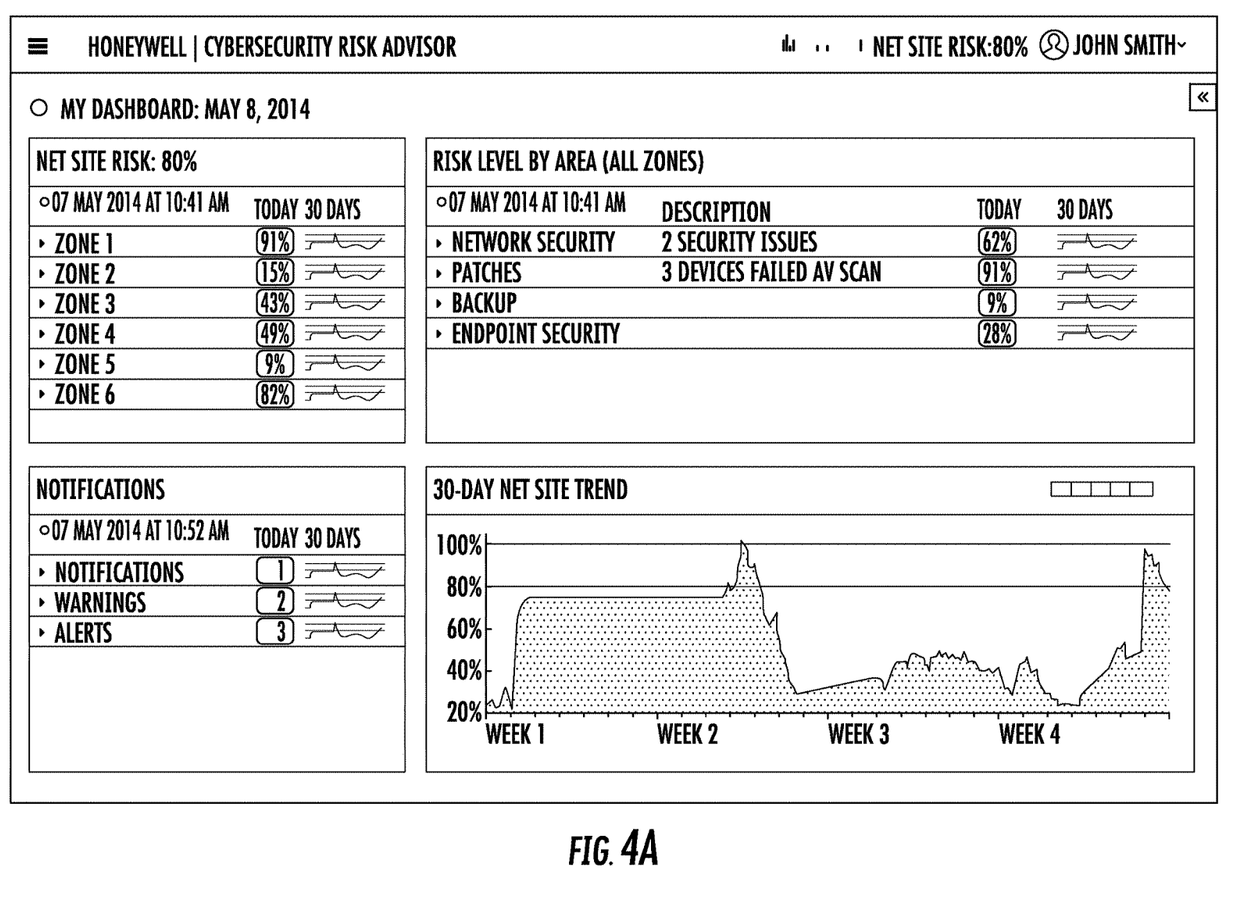
FIGS. 4A-E show various example dashboard views that can be generated by disclosed risk analysis system integrated into a network of an ICS including a plurality of networked devices that are monitored that are grouped into a plurality of different security zones, according to an example embodiment.
Figure 4B:
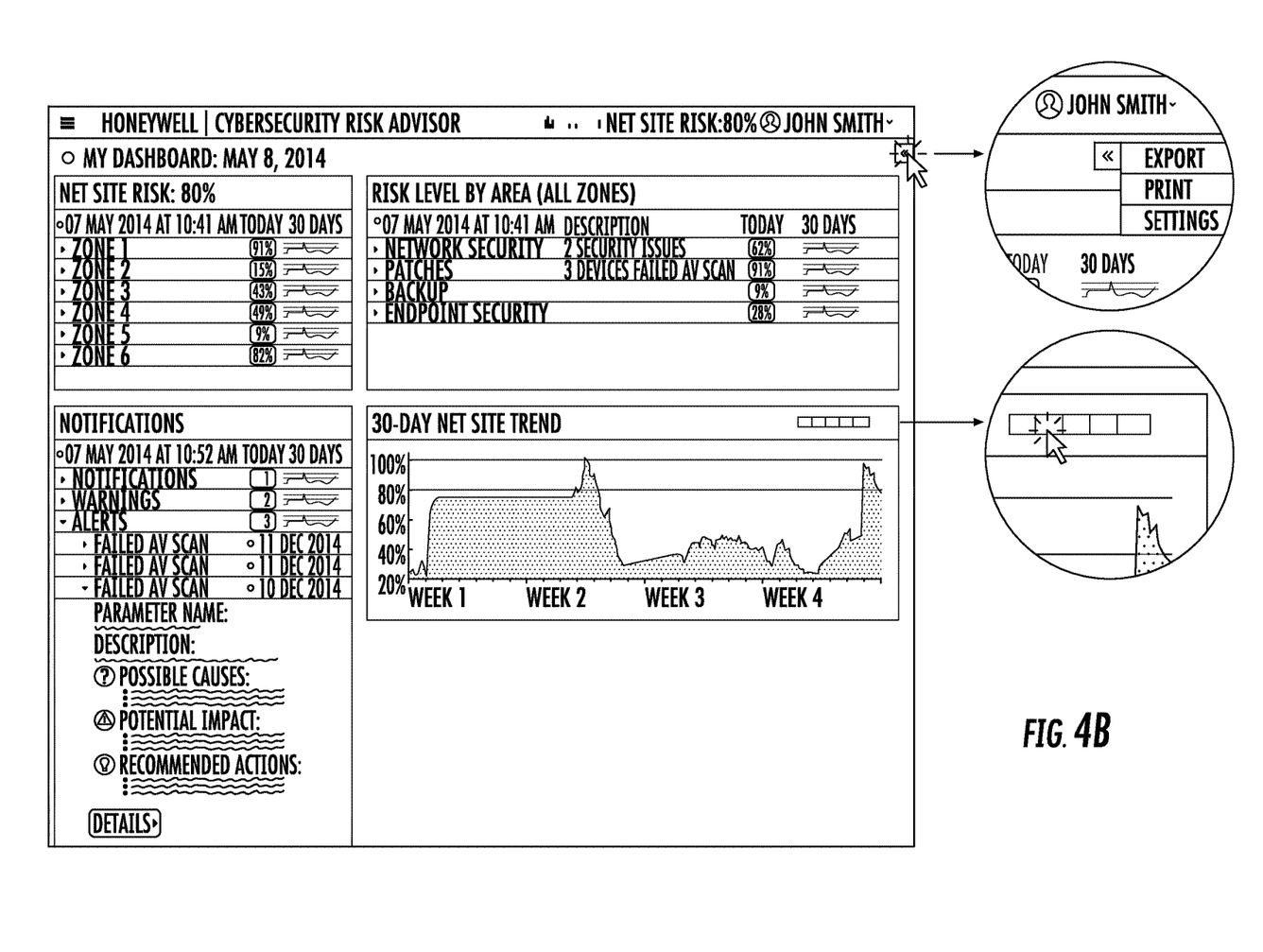

FIGS. 4A-D show various example dashboard views that can be generated by disclosed risk analysis system integrated into a network of an ICS including a plurality of networked devices that are monitored that are grouped into a plurality of different security zones, according to an example embodiment. FIG. 4A shows an example list view which includes a current net site cyber-security risk as well as a site risk for each security zone shown as zones 1-6, as well as a 30 day trend for site risk for the respective zones. Notifications, risk level by area, and a 30 day net site trend for risk are shown. FIG. 4B shows an example expanded list view which further includes details of notifications including specific alerts, as well as a listing of possible causes, potential impacts and recommended actions.

Figure 4C:
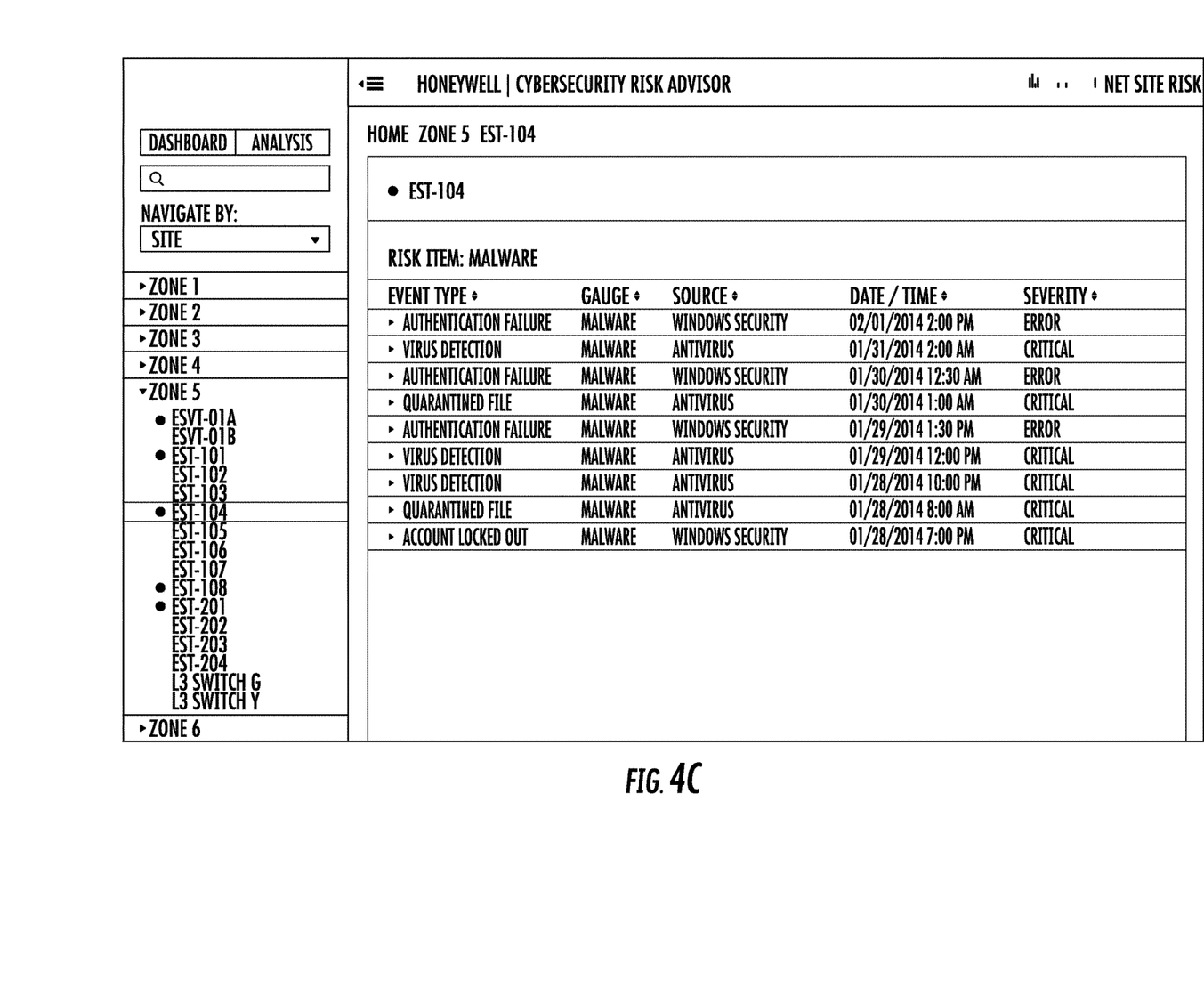
Figure 4D:
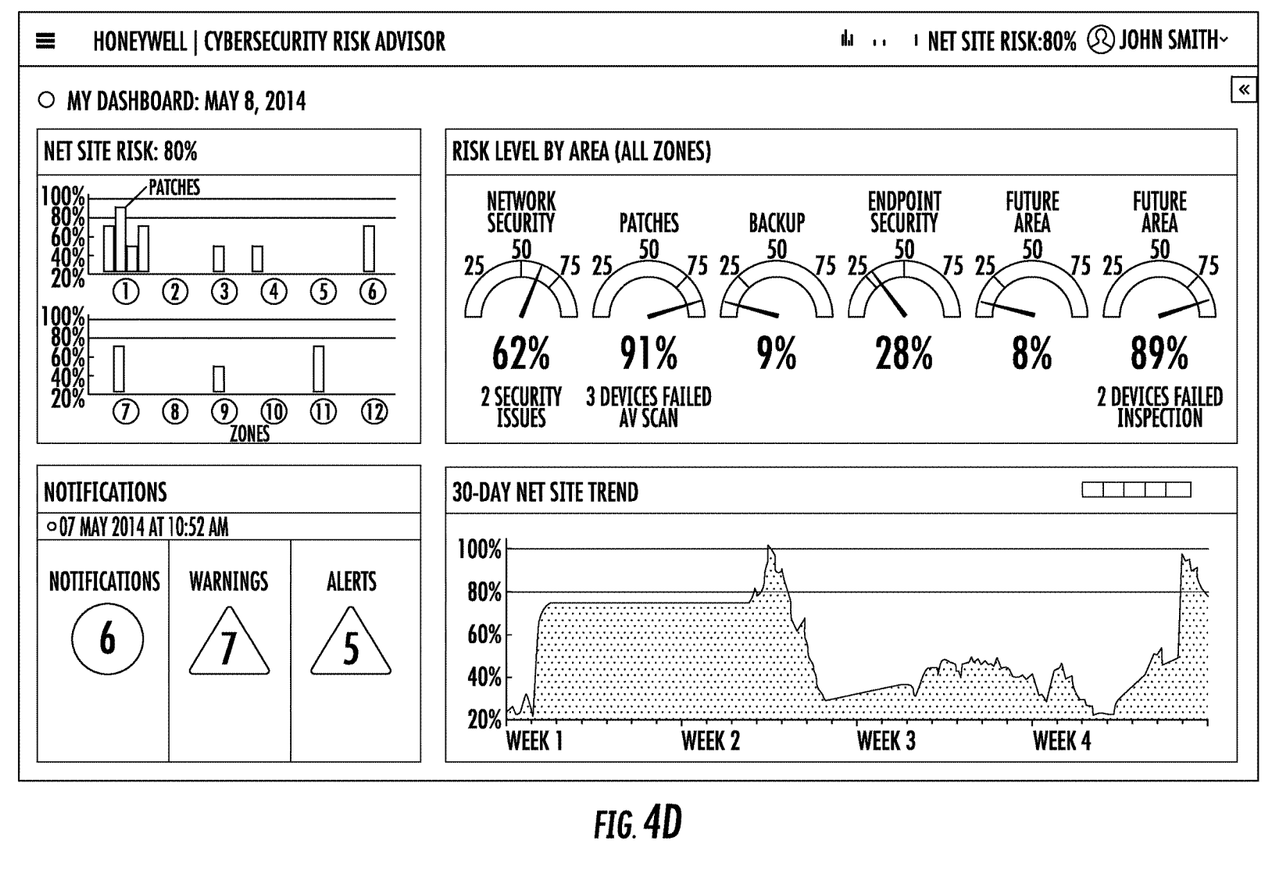

FIG. 4C shows an example full screen analysis view for a user' selected device shown as EST-104 that is in zone 5 under the risk item malware, where there are event types shown, the source of the event, the date/time and the severity. The controls in the heading columns allow for filtering and sorting of the data contained in this analysis view. FIG. 4D shows an example zone-by zone site risk for a 12 security zone system.

Figure 4E:
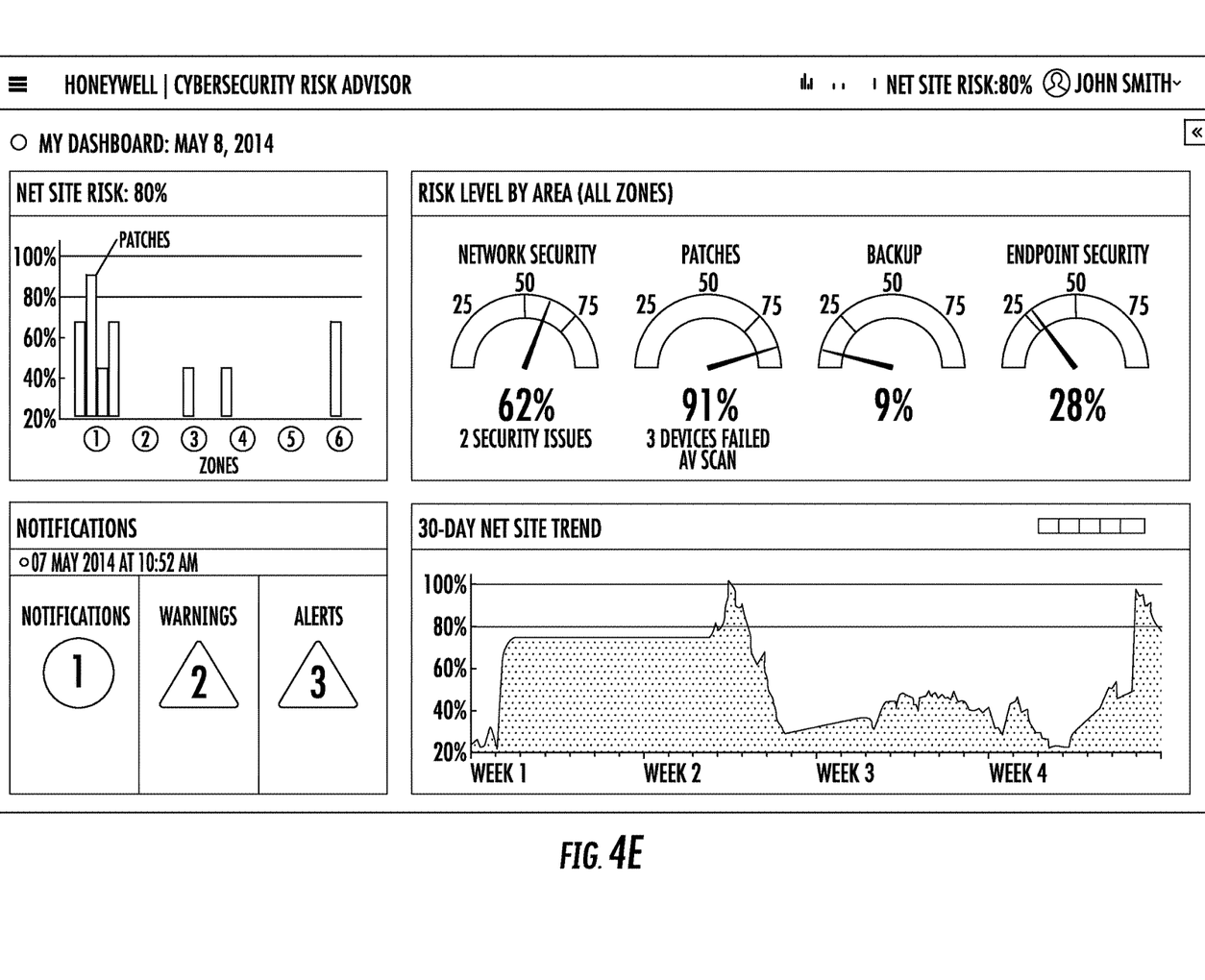

FIG. 4E shows an example billboard view of a 6-zone system which helps show the progression of information disclosure in the system. The basic flow of the system is the user starts at the billboard view in FIG. 4E, which shows the general status of the system. The user can switch the individual elements of the dashboard to a detail view shown in FIG. 4A. The user can further expand to see the list of risk items in the system as well as guidance for each individual risk item shown in FIG. 4B. The user can further go into an analysis view, which allows for tabular review of the data in the system shown in FIG. 4C. The user might filter to see how an individual risk item appears across the whole system. They can also export this filtered view for future reference or hand off to someone to fix the problem that is present.

While various disclosed embodiments have been described above, it should be understood that they have been presented by way of example only, and not as a limitation. For example, regarding application to a business network, given sufficient privileges it would generally be possible to monitor business network devices there to implement a risk manager in the business network. Numerous changes to the disclosed embodiments can be made in accordance with the Disclosure herein without departing from the spirit or scope of this Disclosure. Thus, the breadth and scope of this Disclosure should not be limited by any of the above-described embodiments. Rather, the scope of this Disclosure should be defined in accordance with the following claims and their equivalents.

The invention claimed is:

1. A method of analyzing cyber-security risks (risks) in an industrial control system (ICS) including a plurality of networked devices, comprising:
    providing a processor and an associated memory storing a cyber-security algorithm located in a level of said ICS that is between a business-level and a device-level that includes at least one of actuators and sensors, said processor running said cyber-security algorithm and implementing:
    data collecting to compile security data comprising at least vulnerability data including said risks regarding said plurality of networked devices by scanning said plurality of networked devices;
    processing said security data using a rules engine which associates a numerical score to each of said risks;
    aggregating data including ranking said risks across said plurality of networked devices and arranging said risks into a plurality of security zones that each group together ones of said plurality of networked devices that can freely communicate with one another without an intervening router or firewall to indicate where a cyber-attack might spread if any one of said plurality of networked devices in said group is compromised, and
    displaying at least a portion of said plurality of security zones on a user station.

2. The method of claim 1, wherein said security data further comprises threat level data relating to a degree to which vulnerabilities in said vulnerability data are likely to be exploited, and consequence data relating to a degree of impact felt if the respective one of said plurality of networked devices were successfully exploited.

3. The method of claim 1, wherein said aggregating data further includes aggregating categories of a security state of said plurality of networked devices.

4. The method of claim 1, further comprising generating guidance text with each of said risks including possible causes, potential impact to said ICS and recommended actions, and displaying said guidance text on said user station.

5. The method of claim 1, further comprising discovering said plurality of networked devices.

6. The method of claim 5, wherein said discovering comprises multi-pass discovering.

7. The method of claim 1, wherein said rules engine is part of a rules engine and aggregation module having an internal set of rules for normalizing said vulnerability data, further comprising normalizing said vulnerability data.

8. The method of claim 1, wherein said data collecting monitors said plurality of networked devices essentially continuously for events with security implications including a plurality selected from the group consisting of virus detection, WINDOWS authentication failures, and monitoring include anti-virus, application whitelisting, WINDOWS security events, network security including state of switches, routers, firewalls, and intrusion detection/prevention systems, backup status, patching status and asset policies.

9. The method of claim 1, further comprising generating a risk value for each of said plurality of security zones.

10. A software product, comprising:
    a non-transitory machine readable storage media having code stored therein, said code including executable instructions, which, when executed by a computing device, cause the computing device to implement a cyber-security algorithm for analyzing cyber-security risks (risks) in an industrial control system (ICS) including a plurality of networked devices, that includes a device-level including at least one of actuators and sensors, said code including:
    code for data collecting to compile security data comprising at least vulnerability data including said risks regarding said plurality of networked devices by scanning said plurality of networked devices;
    code for processing said security data using a rules engine which associates a numeric score to each of said risks;
    code for aggregating data including ranking said risks across said plurality of networked devices and arranging said risks into a plurality of security zones that each group together ones of said plurality of networked devices that can freely communicate with one another without an intervening router or firewall to indicate where a cyber-attack might spread if any one of said plurality of networked devices in said group is compromised, and
    code for displaying at least a portion of said plurality of security zones on a user station.

11. The software product of claim 10, wherein said security data further comprises threat level data relating to a degree to which vulnerabilities in said vulnerability data are likely to be exploited, and consequence data relating to a degree of impact felt if the respective one of said plurality of networked devices were successfully exploited.

12. The software product of claim 10, wherein said aggregating data further includes aggregating categories of a security state of said plurality of networked devices.

13. The software product of claim 10, further comprising code for generating guidance text with each of said risks including possible causes, potential impact to said ICS and recommended actions, and displaying said guidance text on said user station.

14. The software product of claim 10, further comprising code for discovering said plurality of networked devices.

15. The software product of claim 14, wherein said discovering comprises multi-pass discovering.

16. The software product of claim 10, wherein said rules engine is part of a rules engine and aggregation module having code for an internal set of rules for normalizing said vulnerability data.

17. The software product of claim 10, wherein said code for data collecting monitors said plurality of networked devices essentially continuously for events with security implications including a plurality selected from the group consisting of virus detection, WINDOWS authentication failures, and monitoring include anti-virus, application whitelisting, WINDOWS security events, network security including state of switches, routers, firewalls, and intrusion detection/prevention systems, backup status, patching status and asset policies.

18. The software product of claim 10, further comprising code for generating a risk value for each of said plurality of security zones.

* * * * *